United States Patent Office 3,193,429
Patented July 6, 1965

3,193,429
METHOD OF MAKING A LAMINATE OF SILANE TREATED GLASS FIBERS
Luther L. Yaeger, Madison, Wis., assignor to Bjorksten Research Laboratories, Inc., Fitchburg, Wis., a corporation of Illinois
No Drawing. Continuation of abandoned application Ser. No. 273,770, Feb. 27, 1952. This application Apr. 9, 1956, Ser. No. 576,816
1 Claim. (Cl. 156—329)

This application is a continuation of application Serial No. 273,770, filed February 27, 1952, now abandoned, which was a continuation-in-part of my formerly copending application Serial No. 170,465, filed June 26, 1950, now abandoned.

This invention relates to a compound in which glass or like polymer constitutes one pole of the molecule, and which is tied through a silicon atom to a vinyl group at the other pole of the molecule. The invention also includes this vinyl-glass compound in which the vinyl group is reacted with a condensation type resin, particularly a resin containing unreacted double bonds as, for example, incompletely reacted phenolic resins, styrenated alkyd resins, alkyd resins, allyl resins and the like. More particularly the invention relates to a laminate in which a glass body or other solid body containing free hydroxy groups is chemically bonded through a silicone group including a vinyl group to a resin layer. The method of making the treated glass body and laminate are included as a part of this invention.

Heretofore it has been particularly difficult to obtain a strong bond, and particularly a leak-free seal between resins and surfaces such as glass which are rich in hydroxyl groups, because the hydroxyl groups have served to facilitate moisture absorption along the interface so as to disrupt the bond or at least permit some moisture leakage.

An object of this invention is to provide improved means for causing adhesion between glass or other solids containing free hydroxy groups and resins.

Another object is to provide a glass surface reaction product which is particularly receptive to a firm integral bond with resins or resinous compounds reactive with unsaturated groups.

Another object is to provide a glass-resin laminate in which water leakage or hydrous swelling along the interface is effectively prevented.

Another object is to provide a glass-resin seal which is particularly useful in the manufacture of mirrors, sealing electronic tubes and the like.

Other objects and advantages of the invention will become apparent as the following detailed description progresses.

In accordance with this invention glass or other solid containing free hydroxy groups is initially reacted with a vinyl halosilane followed by further reaction, hydrolysis and polymerization. The initial reaction is carried out by contacting the vinyl halosilane in solution liquid or gaseous phase with the glass, preferably accelerating the reaction by heat. Further reaction then takes place by subjecting the product to water, preferably with further heat. The initial reaction with the glass is the reaction between a halogen atom of the halosilane with a free hydroxy group of the glass. This is followed by hydrolysis to remove other halogen atoms, accompanied by linkage and cross-linkage through oxygen atoms with the glass and with other molecules of the silane to form a vinylated glass. The reaction and compound formed is represented in the simplest manner by the following equations:

$$(SiO)_{x-y}(O\text{—}Si\text{—}OH)_y + zSiCl_3R \rightarrow yHCl + (SiO_2)_{x-y}(O\text{—}Si\text{—}O\text{—}SiCl_2R)_y + (z-y)SiCl_3R \quad (1)$$

where $z=y$, then in water treatment $$(SiO_2)_{x-y}(O\text{—}Si\text{—}OSiCl_2R)_y + yH_2O \rightarrow 2yHCl + (SiO_2)_{x-y}(O\text{—}Si\text{—}O\text{—}Si(OH)_2R)y \quad (2)$$

when $z>y$, e.g., when $z=3y$, then in water treatment and assuming no cross-bridging (merely for simplification of the illustration)

$$(SiO_2)_{x-y}(O\text{—}Si\text{—}O\text{—}SiCl_2R)_y + 2ySiCl_3R + 4yH_2O \rightarrow 8yHCl + (SiO_2)_{x-y}(O\text{—}Si\text{—}O\text{—}SiR\text{—}[O\text{—}SiR(OH)_2]_2)_y$$

wherein R is an organic group containing a vinyl radical, $x$ is number of silicon atoms in the initial glass, $y$ is number of available OH groups of the glass, and $z$ is number of molecules of silane used.

The unsaturated groups of the vinyl chemically tied to the glass surface remain free to react with partially condensed or partially polymerized resins, and when such resins are condensed or polymerized in contact with the vinylated glass, a reaction and copolymerization takes place, causing the resin to be integrally and chemically bonded to the viynlated glass.

The invention is illustrated by the following examples which are given to illustrate the invention but not in any sense of limitation.

Example 1

A glass plate is immersed in a solution of 10% of vinyl trichlorosilane in toluene, and kept immersed for one minute at a temperature of 50° C. It is then allowed to dry and immersed for one minute in water at a temperature of 30° C., and dried.

The glass plate is now receptive to bonding with any condensation type resin, particularly with resins containing some unreacted double bonds, such as incompletely reacted phenolic resins, or styrenated alkyd resins, alkyd resins, allyl resins and the like. The glass thus treated is useful in itself as an article of commerce, because of its ready bonding characteristics, and its hydrophobic surface.

Upon contact with a frame, for example, of fiber glass laminate and some uncured styrenated alkyd resins, such as, for example, the types known in the trade as "Selectron," "Laminac," or "Vibrin," and curing, the said glass plate becomes firmly bonded to the said frame, in a leakage-free manner. This is useful, for example, in sealing glass observation windows onto pressurized electrical indicating instruments, for high altitude flight, and the like.

Example 2

The glass portion of a vacuum type assembly is dipped in a solution of 10% of allyl vinyl chlorobromosilane in mineral spirits, so that the edge of the said glass portion is in contact with the said solution for 3 minutes. It is then dipped for 1 minute in a solution of 10% beta methallyl alcohol and dried, whereupon it is immersed in water at 70° C. for thirty minutes, and dried. The filament, grids and other internal parts of the vacuum tube are then assembled, the tube evacuated or gas filled, or both, as may be desired, and the base is sealed in place by means of an incompletely polymerized styrene polymer, which is applied in a molten state and allowed to cure in situ.

The resultant vacuum tube is free from leakage at the surface or interface of the seal.

*Example 3*

Woven glass fabric, which had all organic matter on it previously burned off at 750° F. and had been stored under atmospheric conditions, was dried 15 minutes in a circulating air oven at 250° F. It was then immersed in a 5% solution of vinyl trichlorosilane in xylol for several seconds until thoroughly wet, drained, and allowed to air dry. The cloth was washed in warm water and air dried again. Pieces of the treated cloth after being cut to standard dimensions were laminated with a commercial, catalyzed, unsaturated polyester resin and cured with the same time, temperature and pressure conditions as used for commercial types of glass cloth. The cured laminate was cut into strips and tested for flexural strength dry and after boiling in water for three hours.

The silane treated cloth had dry strengths in the same range as the best known commercial size, a chromium-methacrylato complex, but it retained 86% of its dry strength after boiling 3 hours in water as compared with 50 to 70% retained dry strength for the chrome size.

*Example 4*

Heat cleaned cloth was dried in an oven at 300° F. for one hour and then sealed in a container at 75° F. with an open dish of vinyl trichlorosilane. After an hour's exposure it was removed, rinsed in water, air dried and laminated as in Example 3. 80% of the laminate's dry strength was retained after boiling 3 hours in water.

*Example 5*

Coarse cellulose floc was suspended by agitation for half an hour in a 1% solution of vinyl allyldichlorosilane in high flash petroleum naphtha. After filtering the material was dried with a stream of air at 120° F. until free of solvent odor. When used as reinforcement filler for a phenolic resin block formed by compression moulding, the dimensional stability, tensile and impact strength of the block with treated floc was better after seven hours immersion in boiling water than with untreated floc.

*Example 6*

9.25 gm. of beta chlorallyl alcohol in 9 g. of xylol was added slowly to 16.2 gm. vinyl trichlorosilane in 16 gm. xylol. When the reaction ceased and no more hydrogen chloride was evolved, the solution was diluted with 400 gm. xylol. Heat cleaned glass fabric was dried 20 minutes in an oven at 250° F. and immersed while still warm into this treatment and then suspended to dry. After all xylol odor was gone, the cloth was washed in warm water and again air dried. This cloth was saturated with a commercial, unsaturated polyester resin extended with monomeric styrene and containing 0.8% benzoyl peroxide as a catalyst and laminated into ⅛ inch sheets containing 10 plies. Strips from this "upgraded" alkenylchlorosilane cloth had dry flexural strength 28% higher than those from the commercial chrome methacrylato sized cloth and the same resin. Wet flexural strengths after 3 hours in boiling water for the "upgraded" silane cloth were 130% higher than those with the commercial size.

While I have disclosed certain specific unsaturated alcohols, it is understood that other unsaturated alcohols may also be used, such as, for example, cinnamic, 2-buten-1-ol-(crotonyl), para-allylphenol, eugenol, allylmethylpropyl-carbinol (1-hepten-4-ol, 4-methyl), ethynylmethylpropyl-carbinol, 1-butynyl - dimethylcarbinol, isoeugenol, ethylvinylcarbinol, dimethylpropenyl - carbinol, β-allylethyl alcohol, allylmethylcarbinol, o-hydroxy-styrene, m-hydroxystyrene and propargyl alcohol.

Besides unsaturated alcohols, esters containing both groups may also be used, such as ethylene glycol monoacrylate, allyl lactate, and propylene glycol monofumarate.

Besides unsaturated hydroxyl compounds, unsaturated molecules containing other groups reactive with the silane's halogens such as amine or thiol groups may be used. Examples of such compounds would be vinyl amine and allyl mercaptan.

While reference has been made in the above examples to certain specific compounds, uses and methods of reaction and application, it will be understood that the invention is not restricted to these specific conditions or applications.

The vinyl halosilanes react with glass to produce a compound in which one part of the molecule comprises glass at one pole, and there is a vinyl group at the other pole held together by a silicon atom. This type of compound may also be made by using vinyl lactone instead of a vinyl halosilane in the various examples.

The vinyl halosilane or vinyl lactone, or other cyclic vinyl compound, may be reacted with the glass in various ways, as for example, may be applied in the vapor phase, as well as dissolved in any compatible inert solvent. Vinyl siloxane compounds may be used instead of the silanes. Also instead of carrying out the reaction in two or more steps the treatments may be made simultaneously, as for example, the vinyl halosilane may be applied to the glass in the presence of water so that hydrolysis, reaction and polymerization all go along together instead of in steps.

The time and temperature for reaction is not critical so long as the time is sufficient to permit reaction and the temperature is below the decomposition temperature of the substances used.

While reference is made predominantly to glass, it is understood that I may use other solid base material containing free hydroxy groups such as, for example, hydrated silica, polyvinyl alcohol, cellulose, polyvinyl acetals and the like.

Any resin or plastic may be bonded to the vinylated glass or other hydroxy-containing solid, but in order to obtain an integral chemical bond the resin should be one which is chemically reactive with the vinyl group such as an incompletely polymerized or condensed resin containing double or triple bonds.

I claim:

In the process of preparing a laminate comprising plastic laminated to glass fibers, the preparatory steps of applying vinyl trichlorosilane to the surface of a glass fiber, and washing the resultant product with water to provide enhanced bonding through oxygen atoms of molecules of said silane to the glass surface of said fiber and to one another and to remove halogen atoms which may remain attached to the silicon atoms of said silane molecules by forming halogen acid and substituting —OH radicals for said halogen atoms and to dissolve and then remove halogen acid formed by said reactions, and then drying the resultant product to remove water which remains on said product.

(References on following page)

References Cited by the Examiner

UNITED STATES PATENTS

| | | | |
|---|---|---|---|
| 2,512,390 | 6/50 | Sommer | 260—448.2 |
| 2,563,288 | 8/51 | Steinman | 260—488.2 |
| 2,649,396 | 8/53 | Witt et al. | 154—128 |
| 2,751,369 | 6/56 | Te Grotenhuis | 260—41 |

OTHER REFERENCES

Bjorksten et al.: "Modern Plastics," vol. 29, pp. 124 and 188 (1952).

Rochow: "Introduction to Chemistry of the Silicones," first edition (1946), pp. 33–36.

EARL M. BERGERT, *Primary Examiner.*

ALEXANDER WYMANN, CARL F. KRAFFT,
*Examiners.*